Feb. 23, 1932.  W. L. DIXON  1,846,850
DRIVING AND STOPPING MECHANISM
Filed Dec. 26, 1928   2 Sheets-Sheet 1

Inventor.
Walter L. Dixon
by Heard Smith & Tennant
Attys.

Feb. 23, 1932.   W. L. DIXON   1,846,850
DRIVING AND STOPPING MECHANISM
Filed Dec. 26, 1928   2 Sheets-Sheet 2
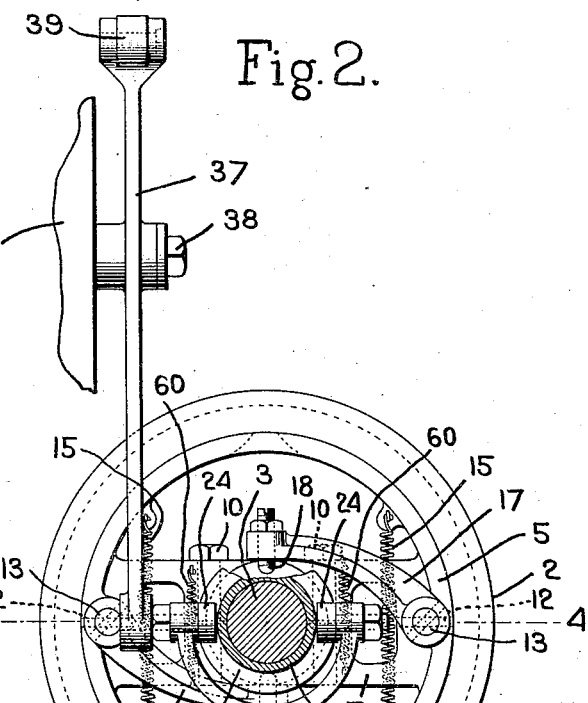
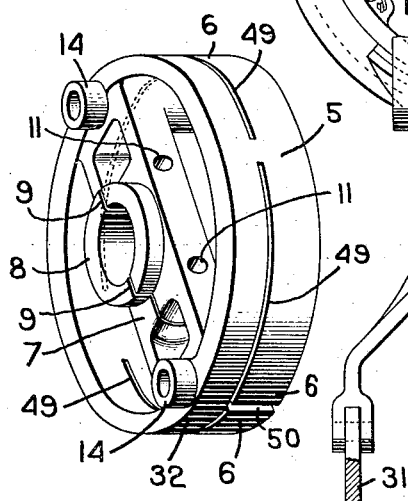
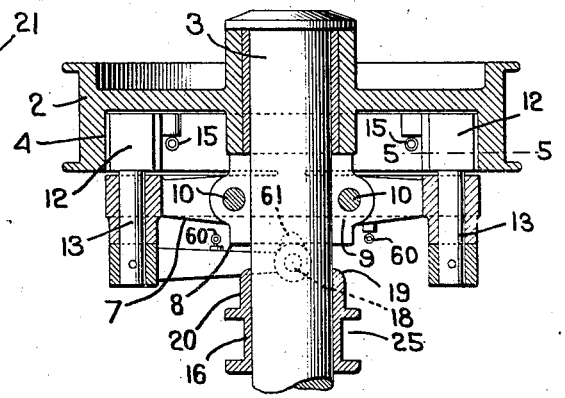
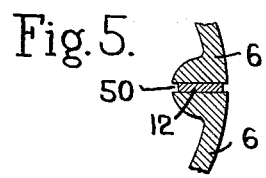
Inventor.
Walter L. Dixon
by Heard Smith & Tennant
Attys.

Patented Feb. 23, 1932

1,846,850

UNITED STATES PATENT OFFICE

WALTER L. DIXON, OF DORCHESTER, MASSACHUSETTS, ASSIGNOR TO REECE FOLDING MACHINE COMPANY, OF BOSTON, MASSACHUSETTS, A CORPORATION OF MAINE

DRIVING AND STOPPING MECHANISM

Application filed December 26, 1928. Serial No. 328,503.

This invention relates to driving and stopping mechanism of that general type which includes a clutch and manual means for engaging or disengaging the clutch at will together with means for automatically disengaging the clutch and bringing the machine to rest at a predetermined point in the cycle of operations.

The improved driving and stopping mechanism which forms the subject of this invention is capable of use in operating a variety of different machines and for this reason I have not shown in the drawings any particular machine.

One of the objects of the invention is to provide a driving and stopping mechanism of this type which is simple in construction and easy to manipulate and which operates to bring the machine to rest without any shock or jar.

The features wherein the invention resides will be more fully hereinafter set forth and then pointed out in the appended claims.

In the drawings, Fig. 1 is a side view of a driving and stopping mechanism embodying my invention;

Fig. 2 is an enlarged section taken on the line 2—2, Fig. 1;

Fig. 3 is a perspective view of the driven member of the clutch and its attached brake member;

Fig. 4 is a section on the line 4—4, Fig. 2;

Fig. 5 is a section on the line 5—5, Fig. 4.

Figure 1:
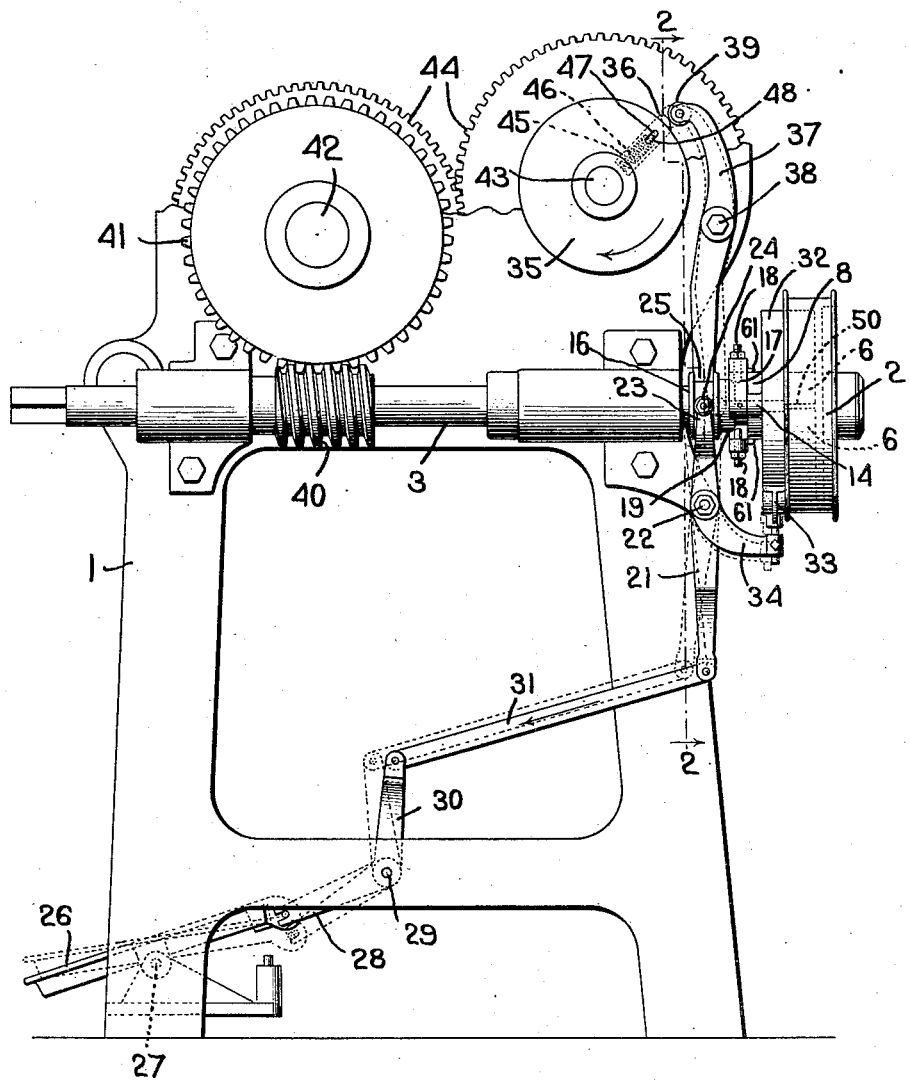

Inasmuch as the driving and stopping mechanism forming the basis of this invention is adaptable for operating a great variety of machines I have not shown in the drawings any particular machine but have simply shown at 1 the frame of the machine to be operated. The driving and stopping mechanism involves a clutch which is herein shown as a friction clutch and includes a driving member and a driven member. The driving member of the clutch is indicated at 2 and is shown as in the form of a driving pulley which is loosely mounted on a shaft 3. The pulley is formed with the interior friction clutch surface 4 with which the driven clutch member co-operates.

The driven clutch member is indicated at 5 and is of the internal expanding type, it having the clutch shoes 6 which are situated within the friction surface 4 of the driving clutch member and which are adapted to be expanded outwardly into frictional engagement with said surface 4 when the clutch is operative.

The clutch member 5 is rigidly secured to the shaft 3. It is shown as having a bridge portion 7 extending diametrically thereacross, which bridge portion is formed with the hub 8 through which the shaft 3 extends. This hub is split as shown at 9 to permit the two halves thereof to be clamped onto the shaft 3 and this clamping is accomplished by clamping bolts 10 extending through apertures 11 in the bridge piece.

The driven clutch member is provided with two pairs of clutch shoes 6 and each pair is expanded outwardly into clutching engagement with the clutch surface 4 by means of a cam member 12 which is located between the ends of the clutch shoes of each pair. Each cam member is carried by a rock shaft 13 which is journalled in a bearing 14 formed in the clutch member, a turning movement of each rock shaft operating through the cam 12 to expand the clutch as usual in clutches of this type. The two clutch shoes of each pair are connected by a spring 15 which serves normally to hold them in their contracted position.

The rock shafts 13 by which the clutch is expanded are given their operative movement through the medium of a clutch cone 16 which is slidably mounted on the shaft 3. Each rock shaft has rigid therewith an arm 17 adjustably carrying at its end a bearing screw 18, the inner end of which is rounded and co-operates with the sleeve 16.

When the sleeve is in its inoperative position the bearing pins 18 are situated just beyond the end of the sleeve, as shown in Figs. 1 and 4, and when this condition obtains the clutch will be disengaged, the shoes 6 being held out of clutching engagement with the surface 4 by the springs 15.

When the clutch sleeve 16 is moved toward the left Fig. 4 the rounded or coned end 19 of the sleeve engages the bearing pins 18 and forces them outwardly thereby rocking the arms 17 and turning the cams 12 to expand the clutch. This throws the two clutching members into clutching engagement. During this movement of the sleeve 16 the bearing pins will ride onto the cylindrical surface 20 where they will rest and thus hold the clutch in engagement until the sleeve is moved back to the position shown in Figs. 1 and 4 again.

The sleeve 16 is adapted to be actuated manually for throwing the clutch into engagement or disengaging the clutch and for this purpose I have shown a clutch-actuating lever 21 pivoted to the frame at 22 and having a forked end 23 which embraces the sleeve 16, said fork having the usual pins 24 that operate in the groove 25 of the sleeve so that swinging movement of the lever 21 will move the clutch-actuating sleeve into and out of operative position.

The lever 21 is herein shown as actuated by a treadle 26 pivoted to the frame at 27. Said treadle is pivotally connected at one end to one arm 28 of an elbow lever which in turn is pivoted to the frame at 29, the other arm 30 of said elbow lever being connected by a link 31 to the lower end of a clutch-actuating lever 21.

The clutch is shown in Fig. 1 in its disengaged position. To throw the clutch into engaged position the operator depresses the toe or inner end of the treadle 26 into the dotted line position Fig. 1, which will operate to move the link 31 toward the left as indicated by the arrow thus moving the upper end of the clutch-actuating lever and the sleeve 16 to the right. A reverse movement of the treadle into the full line position Fig. 1 will cause a disengagement of the clutch as will be obvious.

Associated with the clutch is a brake device for bringing the shaft 3 to rest when the clutch is disengaged and holding it stationary while the clutch is so disengaged. This brake device comprises a brake drum 32 which is integral with and forms part of the clutch member 5 and a brake shoe 33 adapted to engage said brake drum. This shoe 33 is mounted on the lower end of an arm 34, which is rigid with the clutch-actuating lever 21, the construction being such that when the clutch-actuating lever 21 is in the dotted line position Fig. 1 and the clutch is engaged, the brake shoe 33 will be withdrawn from frictional engagement with the brake drum 32 so that the clutch member 5 is free to be rotated. On the other hand, when the clutch-actuating lever 21 is in the full line position Fig. 1 and the clutch is disengaged, the brake shoe 33 is applied to the brake drum.

Means are provided for automatically disengaging the clutch and applying the brake at a predetermined point in the cycle of operations of the machine. This is accomplished herein by a rotary member 35 which is operatively connected to and driven by the shaft 3 and which may conveniently be in the form of a disk. This member 35 carries a stop member 36 which co-operates with a stop lever 37 pivoted intermediate of its ends to the frame 1 as shown at 38, the lower end of the lever 37 being pivotally connected to the yoke 23 of the clutch-actuating lever 21.

The parts are so disposed that when the clutch is engaged, that is, when the clutch-actuating lever 21 is in the dotted line position Fig. 1 the stop lever 37 will be positioned with the upper end thereof bearing on the periphery of the disk 35. This is the position of the parts while the machine is in operation. When during the rotation of the disk 35 the stop projection 36 passes under the roll 39 at the upper end of the stop lever 37 said lever will be swung from the dotted to the full line position Fig. 1, and since the lower end of said lever is connected to the clutch-actuating lever 21 such movement of the stop lever 37 will swing the clutch-actuating lever from the dotted to the full line position thereby withdrawing the clutch sleeve 16 and disengaging the clutch. This same movement applies the brake 33 and brings the shaft 3 to rest.

The rotary member 35 may be operatively connected to the shaft 3 in any suitable way depending upon the character of the machine with which the driving and stopping mechanism is used. As herein shown, the shaft 3 has a worm 40 thereon meshing with a worm gear 41 on a shaft 42 and this shaft 42 is geared to another shaft 43 on which the member 35 is mounted by means of suitable gearing 44. This particular way of operating the member 35 will, of course, be varied depending on the character of the machine.

The machine is brought to rest in the position shown in Fig. 1 with the roll 39 bearing on the stop member 36 and in order that the machine may be started again from the treadle it is necessary to provide a construction which permits the lever 37 to move from the full to the dotted line position. This is herein accomplished by mounting the stop member 36 yieldingly in the rotary member 35. Said stop member is mounted in a radial socket 45 in the member 35 and is backed by a spring 46 which normally urges it outwardly. The spring-impelled movement of the stop member 36 is limited by a pin 47 carried by said member and operating in a slot 48 formed in the rotary member 35. The spring 46 is of sufficient strength so that it will not yield appreciably when the stop member passes under the roll 39 in the act of disengaging the clutch, in other words, this spring has sufficient strength to effect the disengagement of the clutch when the stop member engages the roll 39. When, however, the machine is to be started from its stopped position by operation of the clutch-actuating lever from the full to the dotted line position, the spring 46 permits the stop member 36 to yield inwardly so as to allow the stop lever to swing from the full to the dotted line position.

As soon as the shaft 3 and the member 35 start rotating the stop member 36 is carried out from under the roll 39 and the spring 46 then restores it to its normal position so that when the rotation is completed it will engage the roll 36 and thus release the clutch by moving the stop lever 37 from the dotted to the full line position Fig. 1.

The clutch and the brake mechanism is very responsive so that the operator can throw the clutch into and out of engagement rapidly by simply giving the treadle a rocking movement and the machine can thus be started and stopped at any point in its cycle of operations, but if the clutch is engaged and then is allowed to continue in operation it will be automatically disengaged and the machine will be brought to rest at a predetermined point in the cycle of movement through the medium of the stop device. This stop device is very positive in its action and is practically noiseless.

In making the driven clutch member I propose to provide a casting of the general shape shown in Fig. 3 and then to form therein saw cuts 49 which separate the clutch portion thereof from the brake portion and then I also provide other saw cuts 50 which form with the saw cuts 49 the two pairs of resilient clutch shoes 6.

I claim:

1. In a driving and stopping mechanism, the combination with a clutch comprising a driving member and a driven member, manually-operated means to actuate the clutch, a rotary stop member operatively connected with the driven clutch member, a stop projection movably carried by the said stop member, a spring backing the stop projection, a lever connected to the clutch-actuating means and adapted to be actuated by said projection thereby to disengage the clutch, and means to bring the driven clutch member and stop member to rest with the lever engaging the stop projection, said spring being of sufficient strength to maintain the stop projection in operative position while the lever is being actuated thereby to disengage the clutch but permitting the stop projection to yield when the manually-operated means is actuated to re-engage the clutch.

2. In a driving and stopping mechanism, the combination with a driving clutch member having a friction surface, of a combined driven clutch member and brake drum, the latter presenting an integral structure having an annular formation, one end of which presents an unbroken annular friction brake surface adapted to co-operate with a brake, and the other end of which presents two pairs of expansible clutch shoes adapted to engage the friction face of the driving clutch member, clutch-actuating cams for expanding the clutch shoes into clutching engagement with the friction face of the driving member, a shaft on which the clutch is mounted, a sleeve slidable on said shaft, and means actuated by the sleeve to operate the clutch cams.

3. In a driving and stopping mechanism, the combination with a driving clutch member having a friction surface, of a combined driven clutch member and brake drum, the latter presenting an integral cylindrical structure, one end of which presents an unbroken annular friction brake surface adapted to co-operate with a brake and the other end of which presents a plurality of expansible clutch shoes adapted to engage the friction face of the driving clutch member, and clutch-actuating means adapted to expand the clutch shoes into driving engagement with the said friction surface.

4. In a driving and stopping mechanism of the type comprising a clutch having a driving and a driven member, a brake for the driven member of the clutch, a rotary member carrying a stop projection and actuated by the driven member, a lever actuated by the stop projection for disengaging the clutch and applying the brake, the combination with a stop projection carried by said rotary member and having a cam surface, a spring backing said stop projection and normally holding it in operative position, a lever connected to the clutch-actuating means and brake and adapted to be actuated by the cam surface of said stop projection as the rotary member rotates, the spring having sufficient strength to hold the stop projection in operative position for actuating said lever thereby to disengage the clutch, apply the brake and bring the rotary part to rest with the lever resting on said projection, and manual means for actuating said lever against the action of said spring thereby to release the brake and throw the clutch into engagement.

5. In a driving and stopping mechanism, the combination with a clutch comprising a driving and a driven member, a brake for the driven member, a lever for operating the clutch and the brake, a rotary member actuated by the driven member of the clutch, a stop projection carried by said rotary member and arranged to actuate said lever thereby to disengage the clutch, apply the brake and bring the rotary member to rest with the lever resting on said projection, a spring backing said stop projection, which spring is of sufficient strength to hold the stop projection in operative position while it actuates said lever, and manually-operated means connected to the lever and by which the latter can be turned in opposition to said spring thereby to release the brake and throw the clutch into engagement.

In testimony whereof, I have signed my name to this specification.

WALTER L. DIXON.